Jan. 16, 1923.

O. S. HERSHEY.
AUTOMOBILE LOCK.
FILED JAN. 3, 1921.

Witness:
Stephen T. Rebora

Inventor:
Orville S. Hershey

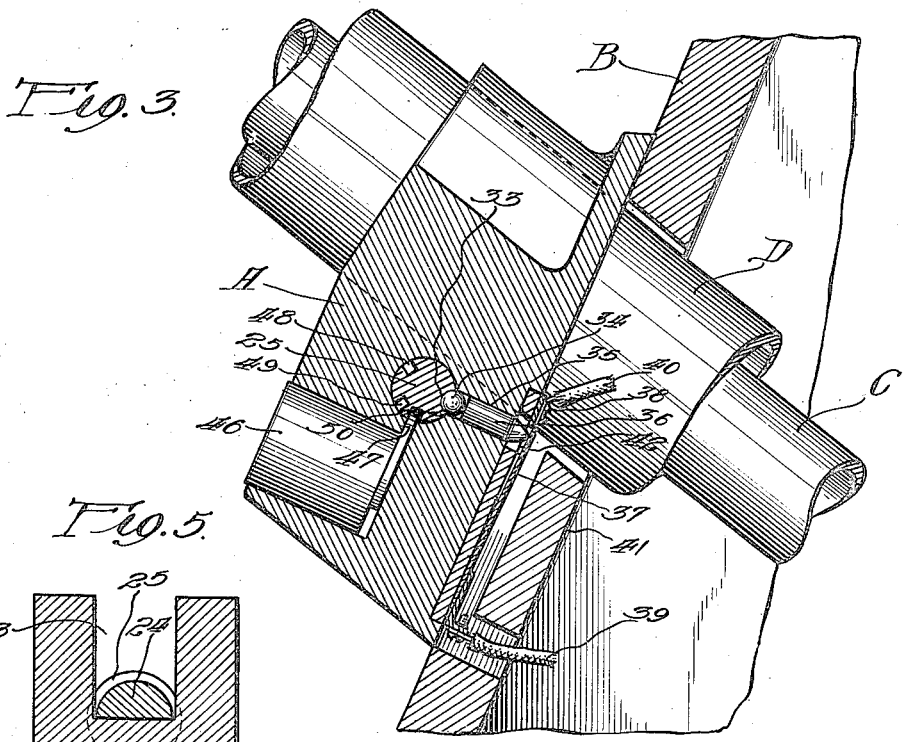
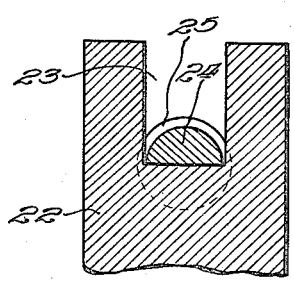
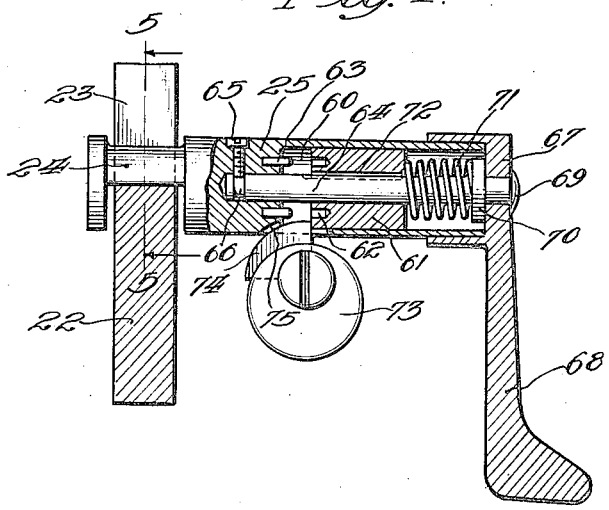

Patented Jan. 16, 1923.

1,442,765

UNITED STATES PATENT OFFICE.

ORVILLE S. HERSHEY, OF STOUGHTON, WISCONSIN, ASSIGNOR TO HERSHEY MANUFACTURING COMPANY, OF DENVER, COLORADO, A CORPORATION OF COLORADO.

AUTOMOBILE LOCK.

Application filed January 3, 1921. Serial No. 434,455.

REISSUED

*To all whom it may concern:*

Be it known that I, ORVILLE S. HERSHEY, a citizen of the United States, residing at Stoughton, in the county of Dane and State of Wisconsin, have invented certain new and useful Improvements in Automobile Locks, of which the following is a specification.

This invention relates to improvements in automobile locks, more particularly to locks of the type used in connection with the steering column of a motor driven vehicle to fasten the shaft extending therethrough against rotation.

It is a primary object of my invention to provide a lock of simple, practical and efficient construction which may be contained within a housing that surrounds the steering column of an automobile, and which, if desired, may be mounted upon the dash or instrument board thereof; and included among the objects is the provision of an ignition lock which may be operated by the same means.

Still further objects will hereinafter appear in the description and claims to follow wherein this invention is represented as consisting of a certain construction and arrangement of parts, of which one exemplification is shown in the accompanying drawings in the manner following:

Fig. 3 is a vertical section therethrough taken on line 3—3 of Fig. 2;

Fig. 4 is a detail in longitudinal section showing a modified form of operating lever for the locking bolt; and Fig. 5 is a sectional detail taken on line 5—5 of Fig. 4.

Figure 1:
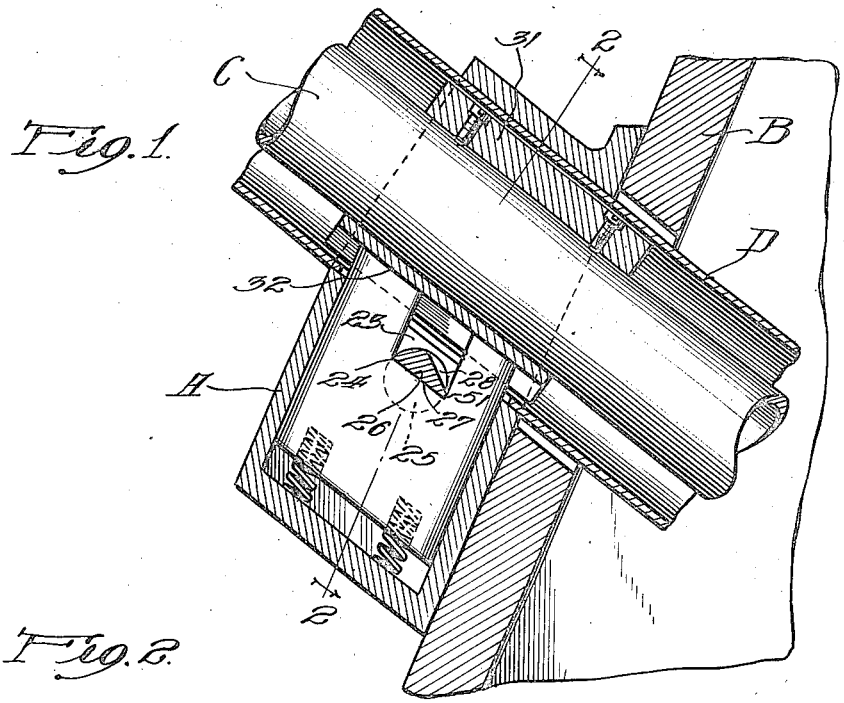
Figure 1 is a vertical section through a housing containing the present lock, the structure being shown as mounted upon the dash or instrument board of an automobile.

The lock shown in the drawing is contained within a housing A that may be mounted upon the instrument board B of an automobile so as to co-operate with the steering shaft C, herein represented as a tube that is surrounded by an outer sleeve D, usually termed the column. The housing is suitably formed to provide a recess 20 for the accommodation of a spring 21 which presses against a bolt 22 whose acting end is preferably slotted as at 23 to receive the eccentric 24 of a shaft 25. The slot end is provided with a flat wall 26, as shown, and the eccentric is also of generally triangular shape in cross section so as to present either of two flat surfaces 27 and 28 to the end wall of the slot, as will more particularly be explained hereinafter.

Figure 2:
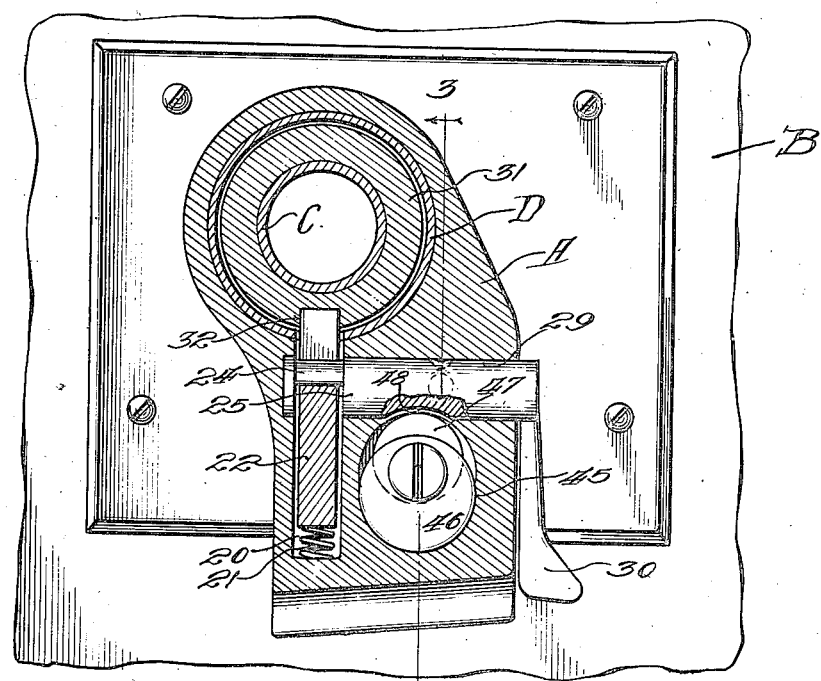
Fig. 2 is a transverse section therethrough taken on line 2—2 of Fig. 1.

As appears best in Fig. 2, the shaft is journaled within a cylindrical opening 29 and extends to the exterior of the housing to connect with an operating lever 30. By the means described the lever serves to rotate the shaft which through the medium of its eccentric 24 acts to depress the bolt 22 against the tension of the spring 21 for the purposes that will be presently pointed out.

The usual automobile steering construction includes a tubular shaft which is arranged within a tubular column of larger diameter, an annular space intervening between these parts. The purposes of this invention are served most practically by fastening to the steering shaft C a collar 31 which is provided with a longitudinal slot 32 adapted to receive the acting end of the locking bolt 22. When the parts are related in this manner, the steering shaft is locked against rotation. It is obvious that the use of this collar merely facilitates the adaptation of the present lock to the automobile steering mechanism, but that the same locking action would result if the slot 32 were formed directly in the steering shaft or tube C rather than in the collar which is made fast thereto. Accordingly in the description and claims to follow the slot 32 will be treated as formed in the shaft, as, in fact it is to all practical intents and purposes.

Associated with the lock mechanism is a device that operates a switch to break or ground the ignition circuit so as to render the engine inoperative. For this purpose I have provided in the shaft 25 at a point which is preferably diametrically opposite the lever 30 a socket 33 which is adapted to partially receive a ball 34 (see Fig. 3) which is slidingly arranged within a bore 35 wherein is also located a pin 36 whose acting end may project rearwardly of the housing A. As a convenient form of switch which is adapted to be opened through the medium of the ball and pin, there is shown a spring arm 37 adapted to overlap a contact plate 38, circuit wires 39 and 40 leading to the arm and plate respectively. A convenient manner of assembling the switch in operative relation with the lock is to mount the two contact parts upon an insulating base 41 which is adapted to be received within a recess upon the rear side of the housing A so as to lie flush therewith. The plate 38 which lies proximate to the pin 36 may be slotted as at 42 to permit the pin end to project therethrough to move the spring arm 37 to thereby break or ground the circuit. The ignition lock just described is operated by the same lever 30 which controls the steering lock. When the shaft 25 is rotated from the position of Fig. 3, the ball 34 will be ejected from the socket 33, thus pushing the pin 36 rearwardly to force the spring arm 37 away from the contact plate 38, thereby breaking or grounding the ignition circuit. I prefer to use a ball and pin as the connecting medium between the shaft 25 and switch, but obviously a single element interposed therebetween, if made of the desired length and shape, would answer the requirements of this invention.

The housing is further provided with a cylindrical opening 45 in which is received a key controlled lock 46 that carries at its inner end an eccentric disk 47 which is adapted to be moved toward and from the shaft 25 as the lock is rotated through the medium of a proper key. This eccentric disk cooperates with the shaft 25 to prevent rotation thereof, and for this purpose I have formed in the shaft a plurality of slits 48, 49, and 50 (see Fig. 3), the preferred number of such slits being three. With the lever 30 arranged diametrically opposite the socket 33, the normal operating relation of the parts, hereinafter termed the first position, would be as indicated in Fig. 3, the lever being then raised to present the slit 50 so as to receive the disk 47. When the key lock is turned to place the disk within this slit, as shown in Fig. 3, the parts may not be moved except through the medium of the proper key, and in this position the shaft and eccentric 24 is held in the position necessary to effect retraction of the locking bolt 22 from the steering shaft. In this position the ignition switch is also closed, so that the engine may be freely operated.

If it is desired to merely lock the ignition, but not the steering apparatus, then the lever 30 is turned sufficiently to permit the disk 47 to enter the slit 49, the key lock being first rotated, of course, to allow of such change in the rotary position of the shaft 25. When the shaft is so turned, to what will be termed second position, the ball 34 will be ejected from the socket 33, so as to open the circuit switch to thereby break or ground the ignition circuit. In such circumstances it will be impossible to operate the engine, although the steering apparatus may be freely used. To lock both the ignition and steering, the lever is turned downwardly to a third position, as shown in Fig. 2, permitting the eccentric disk 47 to then enter the slit 48. In this position the eccentric 24 will have been moved to a point which allows the locking bolt 22 to advance into the slot 32 of the steering shaft whenever the shaft is properly turned for this purpose,— preferably to the straight-ahead position.

By reference to Fig. 1 it will be noted that in cross sectional view the two sides 27 and 28 of the eccentric 24 are in effect chords with respect to the periphery of the shaft 25, the former lying approximately in the plane of its diameter, and that these two sides meet in acute angular relation to form an edge 51 which may be more or less blunt. When both the steering and ignition are locked by turning the shaft to third position, the diametric side 27 of the eccentric will be presented to the slot end 26, thereby permitting the locking bolt to engage with the steering shaft. To bring the shaft into second position so as to lock merely the ignition, the lever 30 must be turned through about 90°, thereby presenting the edge 51 to the slot end 26 in a dead center relation. In the first position where no locking action obtains, the side 28 of the eccentric is presented to the slot end 26, but as this side represents but a short chord the locking bolt will be held sufficiently retracted to remain disengaged from the steering shaft. From the preceding description it will be noted, therefore, that in the second position the eccentric occupies a neutral or dead center relation to the bolt such that it tends, whenever free, to turn to either of the other positions and there remain under the influence of the spring 21.

In Figs. 4 and 5 I have represented a modified construction of shaft and lever for operating the locking bolt. Where the parts correspond to the construction elsewhere shown, like reference numerals have been applied, the locking bolt being designated as 22, its slot as 23, the shaft as 25, the eccentric thereon as 24, etc. The shaft, however, is hollowed to provide a chamber 60 in which is slidingly mounted a collar 61 having in one end openings 62 for the reception of pins 63 that project from the end wall within the chamber. Mounted in this shaft and extending axially through the chamber therein, as well as through the collar 61, is a stem 64, a suggestive means of rotatably anchoring the stem being a set screw 65 which enters the shaft transversely to present its end within an annular groove 66 that is formed in the stem near its inner end. The opposite stem end extends through the hub 67 of an operating lever 68, the hub being formed preferably with cylindrical walls which overlie the proximate end of the shaft. At its outer end the stem is formed with a head 69 which locks the lever fast thereto, and intermediately of the collar and a shoulder 70 formed adjacent the lever hub is a compression spring 71 which is coiled around the stem. A key 72 is used to lock the collar non-rotatably to the stem so that when the collar is pressed toward the pins 63 under the influence of the spring 71 the lever will be clutched to the shaft 25 so as to operate the same.

It will be understood that the locking bolt 22 and the shaft 25 may be mounted within a housing constructed substantially the same as the one illustrated in Figs. 1, 2 and 3. Rotatably mounted within the housing is a key-controlled lock 73 adapted to be rotated through the instrumentality of a proper key (not shown), the lock being provided near its rear end with a laterally extending disk 74 which is adapted to move within a slit 75 in the shaft 25 preliminary to abutting the clutching end of the collar 61 to thereby shift the collar longitudinally away from the pins 63 so as to disestablish connection with the shaft. When the lock 73 is turned through the instrumentality of the proper key to withdraw the disk 74 from engagement with the collar, the latter will again clutch with the shaft due to pressure from the spring 71, so that the lever 68 may be used to operate the shaft to thereby move the locking bolt. In this construction several slits 75 are preferably employed, the number depending upon the different positions desired for the shaft 25.

I claim:

1. In a device of the kind described, a housing adapted for mounting upon the column surrounding an automobile steering shaft, means within the housing adapted to lock the shaft against rotation, said locking means comprising a bolt arranged within the housing movable toward and from the steering shaft, there being means on the shaft with which the acting end of the bolt may co-operate to lock the shaft against movement, a rock shaft operatively related to the locking bolt, and an eccentric on the rock shaft freely engaging the locking bolt to shift the position thereof relative to the steering shaft, and key-controlled means within the housing having operative relation to the rock shaft and adapted to prevent rotation thereof when the same is in a predetermined position, substantially as described.

2. In a device of the kind described, a housing adapted for mounting upon the column surrounding an automobile steering shaft, and means within the housing for locking the shaft against rotation including a bolt spring pressed toward the shaft and adapted to engage therewith, there being an open slot in the bolt, and a rock shaft having its axis transverse to the plane of movement of the bolt and provided with an eccentric entering the slot thereof, the eccentric being in the form of two angularly related flat sides such that one of them is normally faced against the slot end under the spring action imparted to the bolt, substantially as described.

3. In a device of the kind described, a housing adapted for mounting upon the column surrounding an automobile steering shaft, and means within the housing for locking the shaft against rotation comprising tension means urging the bolt toward the shaft, there being an open slot in the bolt end adjacent the shaft, and a rock shaft having a cam thereon disposed within the bolt slot and freely removable therefrom, the rock shaft being adapted to retract the bolt from engaging relation with the steering shaft, substantially as described.

4. In a device of the kind described, a steering lock, operating means therefor, an ignition lock, and a connection from the operating means to the ignition lock such that the latter may be operated independently of the steering lock, substantially as described.

5. In a device of the kind described, a steering lock, an ignition lock, and a single control means adapted to operate either the latter alone or both together, substantially as described.

ORVILLE S. HERSHEY.

Witness:
EPHRAIM BANNING.